United States Patent
Zhou

(10) Patent No.: US 10,303,805 B2
(45) Date of Patent: *May 28, 2019

(54) DELETION WORKFLOW THAT PRESERVES DATA INTEGRITY OF A RECORDS MANAGEMENT SYSTEM

(71) Applicant: International Business Machines Corporation, Armonk, NY (US)

(72) Inventor: Li Zhou, Palo Alto, CA (US)

(73) Assignee: International Business Machines Corporation, Armonk, NY (US)

(*) Notice: Subject to any disclaimer, the term of this patent is extended or adjusted under 35 U.S.C. 154(b) by 541 days.

This patent is subject to a terminal disclaimer.

(21) Appl. No.: 14/622,312

(22) Filed: Feb. 13, 2015

(65) Prior Publication Data

US 2015/0370846 A1    Dec. 24, 2015

Related U.S. Application Data

(63) Continuation of application No. 14/310,983, filed on Jun. 20, 2014.

(51) Int. Cl.
*G06F 7/00* (2006.01)
*G06F 17/00* (2019.01)
(Continued)

(52) U.S. Cl.
CPC .. *G06F 17/30876* (2013.01); *G06F 17/30371* (2013.01); *G06Q 10/06* (2013.01)

(58) Field of Classification Search
CPC ........ G06F 17/30876; G06F 17/30371; G06Q 10/06
See application file for complete search history.

(56) References Cited

U.S. PATENT DOCUMENTS 7,689,563 B1    3/2010 Jacobson
8,812,464 B2 *  8/2014 Sambamurthy .... G06Q 30/0201
                                                707/694

(Continued)

FOREIGN PATENT DOCUMENTS

WO          201136773 A1    3/2011

OTHER PUBLICATIONS

Zhu, W-D. et al.; "Understanding IBM FileNet Records Manager"; IBM Corporation, http://www.ibm.com/redbooks/sg24-7623-00 . . . ; May 2009.

(Continued)

*Primary Examiner* — Azam M Cheema
(74) *Attorney, Agent, or Firm* — Patterson + Sheridan, LLP

(57) ABSTRACT

Embodiments presented herein provide techniques for preserving data integrity of a records management deletion workflow. According to one embodiment, a records management system identifies a set of records subject to a document retention policy. The set of records includes electronic records and physical records. The records management system generates a disposal report listing the records and information associated with the records. The disposal report is associated with an identifier. The records management system performs a deletion workflow to remove the records listed in the report. After the records are removed, physical media corresponding to the deleted physical records are destroyed.

20 Claims, 6 Drawing Sheets

(51) Int. Cl.
*G06F 17/30* (2006.01)
*G06Q 10/06* (2012.01)

(56) References Cited

U.S. PATENT DOCUMENTS

| | | | |
|---|---|---|---|
| 9,298,707 B1* | 3/2016 | Zhang | G06F 17/30008 |
| 2006/0156382 A1* | 7/2006 | Motoyama | G06F 21/6209 |
| | | | 726/1 |
| 2007/0038683 A1 | 2/2007 | Dixon et al. | |
| 2007/0094311 A1 | 4/2007 | Pelletier et al. | |
| 2009/0070324 A1* | 3/2009 | Yoshino | H04N 7/17318 |
| 2009/0299907 A1* | 12/2009 | Cofano | G06Q 30/02 |
| | | | 705/80 |
| 2011/0205576 A1 | 8/2011 | Halron et al. | |
| 2012/0130953 A1 | 5/2012 | Hind et al. | |
| 2013/0325822 A1 | 12/2013 | Sambamurthy et al. | |
| 2015/0278482 A1* | 10/2015 | Mattera | G06F 19/3487 |
| | | | 705/3 |

OTHER PUBLICATIONS

Olston, C.; "Method and System for Handling Evolving Workflows"; An IP.com Prior Art Database Technical Disclosure; http://ip.com/IPCOM/000197161D; Jun. 25, 2010.

Zhou; "Deletion Workflow That Preserves Data Integrity of a Records Management System", U.S. Appl. No. 14/310,983, filed Jun. 20, 2014.

List of IBM Patents or Patent Applications Treated as Related.

Rathgeber et al.: "Processes to Better Support Defensible Disposabl in Records Management", U.S. Appl. No. 14/622,149, filed Feb. 13, 2015.

\* cited by examiner

| DISPOSAL REPORT 400 | | | |
|---|---|---|---|
| REPORT ID: E46 | | | |
| DISPOSAL DATE: 03/21/2015 | | | |
| REVIEWER: legal@abc-comp.org | | | |

| ID | RECORD NAME | DESCRIPTION | LOCATION |
|---|---|---|---|
| E12 | gyrrzz.doc | | Omaha |
| E13 | ssdqqd.rtf | | New York City |
| E16 | fqqedf.doc | | New York City |
| E21 | qwfsfds.doc | | Akron |
| E25 | sefsbb.docx | | Omaha |
| P29 | File-ROTHMAN | | Akron |
| P31 | File-LEONARD | | Akron |
| P33 | MF-HEARST | | Akron |
| E34 | awdgewsg.doc | | New York City |
| E39 | sefseghe.doc | | Cheyenne |
| P42 | T-RUDDIGER | | Akron |
| E48 | esghrhns.doc | | New York City |
| E63 | seggesss.doc | | Omaha |
| P66 | T-LLAMA | | Akron |
| P72 | sesgevvv.doc | | Akron |

FIGURE 4

DELETION WORKFLOW THAT PRESERVES DATA INTEGRITY OF A RECORDS MANAGEMENT SYSTEM

CROSS-REFERENCE TO RELATED APPLICATION

This application is a continuation of co-pending U.S. patent application Ser. No. 14/310,983, filed Jun. 20, 2014. The aforementioned related patent application is herein incorporated by reference in its entirety.

BACKGROUND

Records management is a formal structured process of preserving needed content and destroying content that is no longer needed. The records management process allows an entity to demonstrate, e.g., for legal purposes, that any action taken to destroy or delete documents (or any other records) is (or was) performed in good faith. A traditional records management system may maintain electronic and physical records. For example, electronic records may represent documents (e.g., e-mails, word processor documents, and the like) maintained by the records management system. Further, enterprises often maintain large warehouses storing physical media, such as paper correspondence, microfilm, tapes, and the like. The records management system may include electronic records that reference the physical media items. The records may include pointer metadata corresponding to the physical media. An electronic record that references a physical media item may include metadata describing the item.

Further, the proliferation of electronic records has created a large data "warehouse" that an enterprise may need to maintain. To manage records, an enterprise may define retention policies that allow the records management system to identify when a record is to be destroyed. The retention policies specify a period for maintaining records in the system. The records management system may pass records to be destroyed to a deletion workflow. The deletion workflow includes a review step, where an assigned reviewer approves or rejects the destruction of records before the records are actually destroyed. If appropriate, records that the reviewer rejects may be placed on hold or updated to avoid destruction. The approved records are then destroyed.

SUMMARY

Embodiments presented herein provide a method for managing a record deletion workflow identifying both electronic records and physical media items. The method generally includes identifying, via a processor, records subject to deletion following a date specified by a document retention policy. At least a first one of the records references a corresponding physical media item subject to the document retention policy. The method also includes generating a disposal report listing the identified records, wherein the disposal report is associated with an identifier. The method also includes initiating a workflow to delete the records listed in the disposal report. The workflow generally comprises receiving a confirmation to delete a set of electronic records selected from the identified records and deleting the set of electronic records.

Another embodiment includes a system having a processor and a memory storing a program, which, when executed on the processor, performs an operation for managing a record deletion workflow identifying both electronic records and physical media items. The operation itself may include identifying records subject to deletion following a date specified by a document retention policy. At least a first one of the records references a corresponding physical media item subject to the document retention policy. The operation may also include generating a disposal report listing the identified records, wherein the disposal report is associated with an identifier and initiating a workflow to delete the records listed in the disposal report.

Still another embodiment includes a computer program product comprising a computer-readable storage medium having computer-readable program code embodied therewith, the computer-readable program code configured to perform an operation for managing a record deletion workflow identifying both electronic records and physical media items. The operation itself may include identifying records subject to deletion following a date specified by a document retention policy. At least a first one of the records references a corresponding physical media item subject to the document retention policy. The operation may also include generating a disposal report listing the identified records, wherein the disposal report is associated with an identifier and initiating a workflow to delete the records listed in the disposal report.

BRIEF DESCRIPTION OF THE SEVERAL VIEWS OF THE DRAWINGS

FIG. 4 illustrates an example report that lists records to be disposed after a retention period elapses.

DETAILED DESCRIPTION

Figure 1:
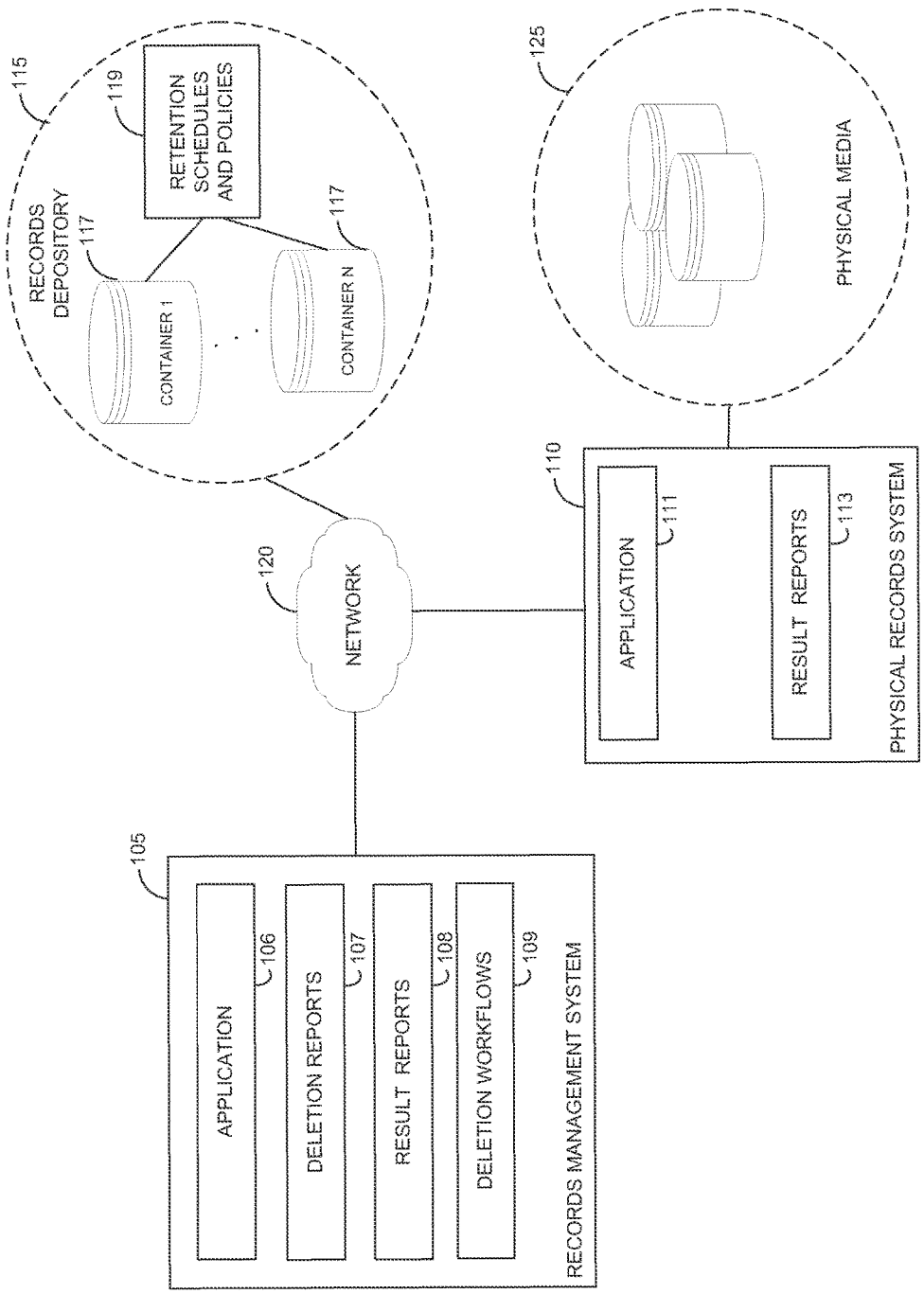
FIG. 1 illustrates an example records management environment, according to one embodiment.

A deletion workflow of a records management system generally involves deleting an electronic record from a depository where the records are maintained. Further, for enterprises that maintain electronic records that reference physical media items (e.g., paper documents, videotape, microfilm, compact discs, etc.), the deletion workflow must also include a step for destroying the physical media referenced by an electronic record scheduled to be deleted. In a typical deletion workflow, after a reviewer has approved records to be destroyed, an assigned keeper of corresponding physical media destroys the media. After the physical media is destroyed, the corresponding electronic record is deleted from the records management system.

However, in between the approval and the deletion of the corresponding electronic record, it is possible that the physical media may become needed (e.g., for litigation purposes), and so it may become necessary to place a hold on the record during the deletion workflow. However, a problem arises if the assigned keeper of the physical media is not notified of the new hold and subsequently destroys the corresponding media. In such a case, the electronic record referencing the physical media still exists, but the actual physical media has already been destroyed.

In addition, current approaches lack scalability because of schema limits in a records database. Each record includes a globally unique identifier (GUID). Further, the GUID of each record to be deleted is stored in a string array. The field size of such a structure can only store a limited amount of GUIDs. As a result, a deletion workflow may be unable to process an amount of records larger than the size of the array.

Embodiments presented herein describe techniques for preserving data integrity of a records management deletion workflow. In one embodiment, a records management system generates a disposal report listing physical and electronic records that are to be deleted at a scheduled date based on a retention policy. The report is identified by a GUID and similarly includes GUIDs of the physical and electronic records. The records management system passes the GUID of the report to a deletion workflow. Passing a GUID of the generated disposal report to the deletion workflow instead of a string array of individual record GUIDs allows all records listed in the report to be processed using a single instance of the deletion workflow.

In one embodiment, the deletion workflow includes an approval step where an assigned reviewer is given the opportunity to review the generated report and place documents on hold. After the reviewer completes the approval step, the records management system deletes the electronic records, including the records that reference physical media. After deletion, the records management system generates a results report that lists records that were deleted and were not deleted. The records management system forwards the results report to a record keeper of the physical media corresponding to the deleted electronic records. The record keeper destroys the corresponding physical media.

As stated, the records management system passes a GUID of the generated disposal report to the deletion workflow instead of a string array of individual record GUIDs. Advantageously, doing so allows all records scheduled to be deleted to be processed in a single workflow instance. As a result, the deletion workflow becomes more highly scalable. Further, deleting electronic records referencing physical media before destroying the corresponding physical media ensures that integrity of the records management system is maintained. For example, physical media remains intact if a litigation hold becomes necessary after the deletion workflow has been initiated and the corresponding record still exists. That is, this approach prevents a situation where an electronic record references a physical document (or group of documents) that has been destroyed.

FIG. 1 illustrates an example records management environment 100, according to one embodiment. As shown, the records management environment 100 includes a records management system 105. The records management system 105 may be a physical computing system (e.g., a system in a data center) or may be a virtual computing instance executing within a computing cloud. In one embodiment, the records management system 105 may be deployed to manage documents created or obtained by an enterprise. The records management system 105 store records located in a record depository 115. An enterprise may maintain documents and other records captured and stored by the records management system 105 in the record depository 115.

Illustratively, the record depository 110 includes multiple containers 117 that each store enterprise records. Each record may be identified by the records management system 105 with an identifier. The identifier may be a globally unique identifier (GUID). The records may be stored in containers 117 based on record categories. For example, one container 117 may store records pertaining to human resources documents, while another container 117 may store records pertaining to legal documents. Further, containers 117 may also store records related to physical media 125. A container 117 of physical media 125 records may include metadata describing the physical media, such as where the media is physically located, a type of the media (e.g., whether the media is paper documents, video tapes, microfilm, etc.), and so on. The physical media 125 may be stored in a warehouse or other exterior site separate from the records management system 105. Further, a physical records system 110 may maintain the physical media 125.

Each container 117 is subject to retention policies 119 of the enterprise. The retention policies 119 specify attributes that allow the records management system 105 to handle properties of each record (e.g., deletion dates, chain of command, and the like) according to the corresponding policy 119. Further, a document retention reviewer may be assigned to a container 117 to ensure that disposal processes are carried out according to the retention policies 119. For example, a human resources manager may assigned as a reviewer for a container 115 that stores human resources documents, and an information technology manager may be assigned as a reviewer for a container 115 that stores information technology documents.

In one embodiment, the records management system 105 includes an application 106. The application 106 generates a deletion report 107 that lists electronic records (including records referencing physical media 125) that are scheduled to be destroyed based on the retention policies 119. When generated, the application 106 assigns the deletion report 107 a GUID. The application 106 passes the GUID of the deletion report 107 to a deletion workflow 109. The deletion workflow 109 receives the GUID of the deletion report 107 as a parameter and deletes the records listed in the deletion report 107. The deletion workflow 107 is further discussed in FIG. 5.

After deleting the records, the records management system 105 generates a result report 108 that lists electronic records from the deletion report 107 that have been deleted. Further, if any record from the deletion report 107 was not deleted (e.g., because of a litigation hold, change in the retention policies 119, security reasons, and the like), the result report 108 may also include a listing of the records that were not deleted.

In one embodiment, the deletion workflow 107 includes a step where physical media corresponding to deleted electronic records are destroyed. In such a case, the records management sends the generated result report 108 to the physical records system 110. The physical records system 110 receives, via an application 111, the result report 108 (shown as result report 113). A record keeper may review the result report 113 and identify which of the physical media 125 to destroy. The record keeper may then destroy the identified physical media 125. Sending the result report 113 to indicate which physical media 125 should be destroyed ensures the integrity of the records management environment 100. More specifically, physical media 125 cannot be destroyed before its corresponding record has already been deleted.

Figure 2:
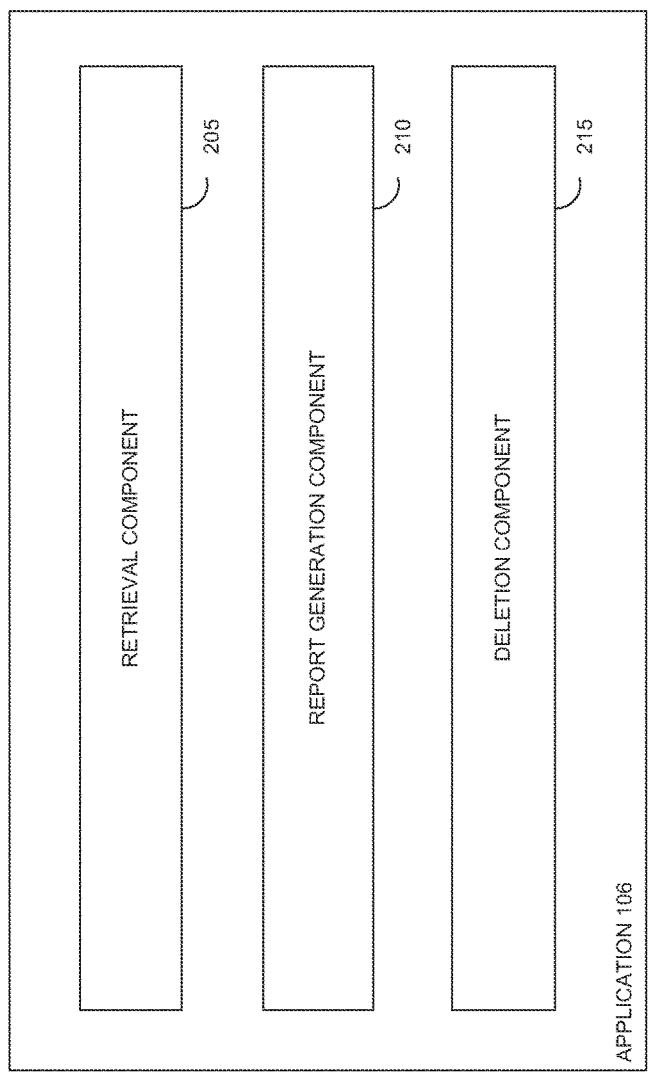
FIG. 2 illustrates an example application configured to manage records, according to one embodiment.

FIG. 2 further illustrates the application 106, according to one embodiment. As shown, the application 106 includes a retrieval component 205, a report generation component 210, and a deletion component 215.

In one embodiment, the retrieval component 205 obtains records and information pertaining to each record (e.g., record ID's, container source information, retention trigger properties, whether the record is a physical or an electronic record, etc.) from the containers 117 in advance of a scheduled deletion date according to an associated policy 119. The advance period may be a configurable value (e.g., five days in advance, one month in advance, three months in advance, etc.).

The generation component 210 creates different types of reports for the records management system 105. For example, the generation component 210 creates a disposal report based on the records obtained by the retrieval component 205. The application 106 may organize the report based on a reviewer for a container storing such records. That is, all records assigned to a particular reviewer may be included in a single report. Each report includes a listing of the records scheduled to be deleted on a certain date as well as other information associated with the records. Such information may include a record identifier, file name, description, document source information, and the like. In addition, each generated report includes a globally unique identifier (GUID) used by the deletion component 215. FIG. 4 further illustrates an example disposal report generated for a container 117. The generation component 210 may forward the report to one or more reviewers (e.g., as an e-mail attachment, via a console display, etc.) to evaluate.

After the generation component 210 creates a document retention report for a set of records, the deletion component 215 may initiate a deletion workflow. If a reviewer has not modified any policies pertaining to the records listed in the report, then at the scheduled deletion date, the deletion component 210 disposes the records listed in the report that have not been placed on hold by a reviewer of the report. To dispose the records, the deletion component 210 parses the report to identify the records set for deletion and subsequently removes the records from the container. The deletion component 210 may dispose the records according to the policy 119 associated with the records. Further, the deletion component 210 may notify the generation component 210 of the records from the disposal report that have been deleted and the records that were not deleted. In turn, the generation component 210 creates a result report for records that were deleted and records that were not deleted during the workflow. The generation component 210 may forward the report to an assigned record keeper of corresponding physical media 125, where the record keeper destroys the physical media 125 associated with deleted electronic records.

Figure 3:
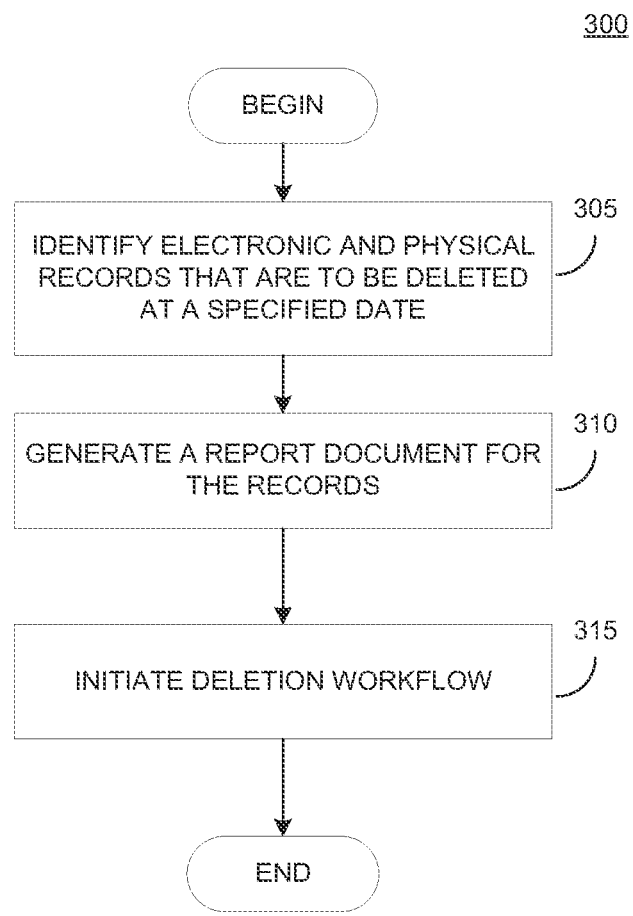
FIG. 3 illustrates a method for generating a report of records to be deleted at a scheduled date, according to one embodiment.

FIG. 3 illustrates a method for generating a disposal report, according to one embodiment. At step 305, the retrieval component 305 identifies electronic and physical records that are to be deleted at a date based on the retention schedule and policy 119. At step 310, the generation component 310 creates a disposal report that lists the identified electronic and physical records. At step 315, the deletion component 215 passes the GUID of the generated disposal report to a deletion workflow and initiates the workflow.

FIG. 4 illustrates an example disposal report 400 generated by application 106, according to one embodiment. After the generation component 210 creates the report 400, the application 106 may forward the report 400 to a reviewer. Illustratively, the report 400 provides information about records scheduled to be disposed as well as information about the report 400 itself. The record may be presented in any number of formats, such as a spreadsheet, word processor document, and the like.

The report 400 includes an identifier field 405, which specifies an identifier for the report 400. The identifier may be a globally unique identifier (GUID). The disposal date field 406 specifies the date in which the records management system is to delete the records to adhere to the policy. The report 400 may also provide a reviewer field 408 that specifies a reviewer that is responsible for examining the report 400. The reviewer field 408 in the report 400 may specify an e-mail address to which the generation component 215 forwards the report 400. Alternatively, the reviewer field may also be a directory name or a name of a reviewing individual.

The report 400 provides a listing of records in the container that are scheduled to expire on the disposal date specified in field 407. Illustratively, the records are listed by row and in order of record identifiers 410. Illustratively, a letter P or E in each identifier 410 indicates whether the record is a physical or an electronic record, respectively. Of course, the report 400 may also indicate whether a record is a physical or electronic record through other means, such as through an additional column for each record.

Each row also includes a record filename 411, a record description 412, and a record location 413. The record name 411 is a reference name of the record. A record name 411 of an electronic record may be a filename of the record. The record description 412 provides specified descriptions and metadata associated with the record. A record description 412 of a physical record may include information associated with corresponding media, such as metadata describing the media. The record location 413 specifies where a corresponding record originated. For instance, the record location 413 may specify locations in the case where an enterprise has offices in separate national or worldwide locations. Alternatively, the location 413 may specify the department name where the record originated.

As stated, the deletion component 210 passes the GUID of the report (identifier field 405) to a deletion workflow. A reviewer examines the report 400 to determine whether any records listed in the report should be placed on hold instead of deleted. The reviewer may also modify the retention policy associated with the records to change the disposition date. In either case, the application 106 may generate an additional report corresponding to records not deleted on the disposition date listed in the report 400. Doing so provides an additional audit record that provides reasons why certain records were not deleted on the scheduled disposition date (e.g., because the reviewer placed the record on hold, because the reviewer modified the retention policy, etc.).

Figure 5:
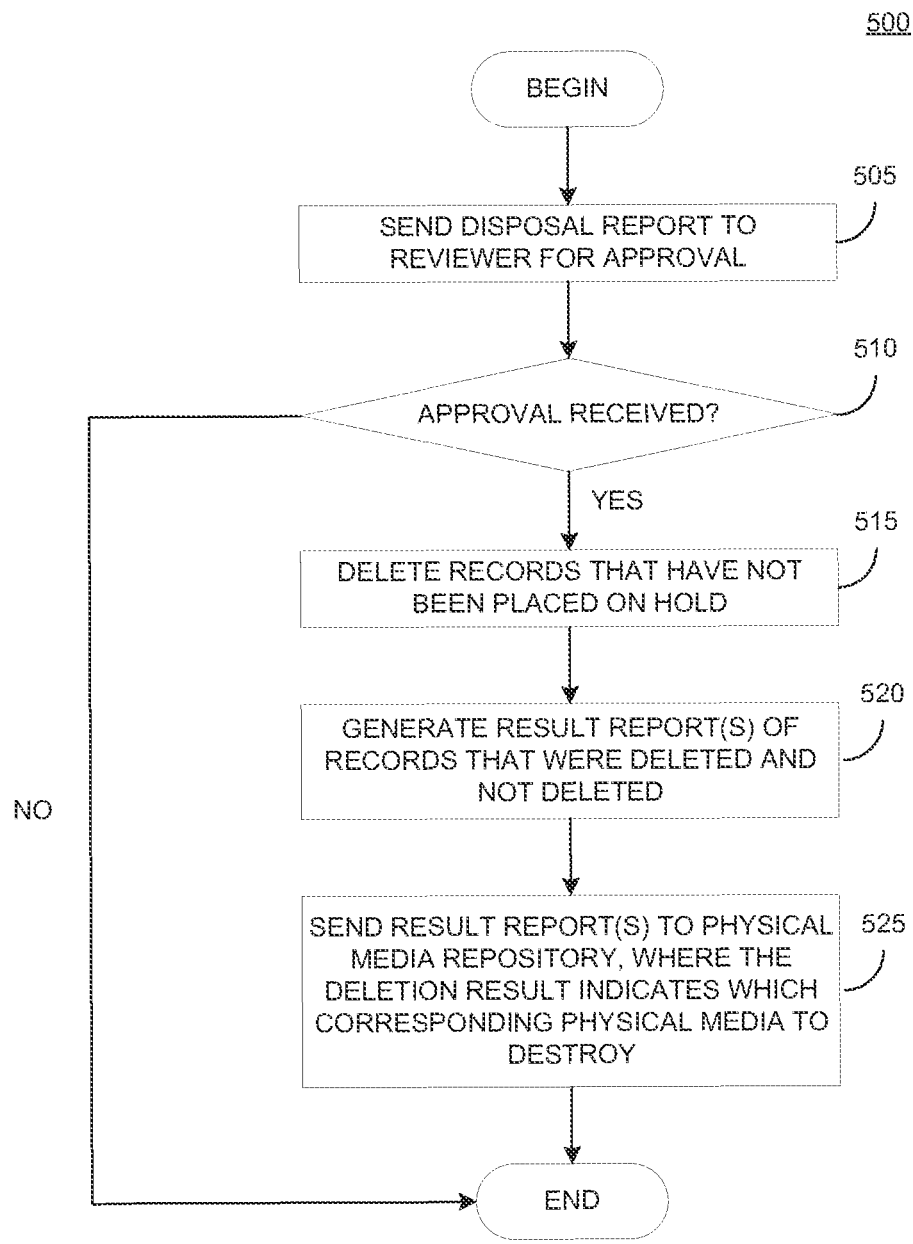
FIG. 5 illustrates a method for destroying records identified in a generated deletion report, according to one embodiment.

FIG. 5 illustrates a method 500 for disposing electronic and physical records passed through a deletion workflow, according to one embodiment. Method 500 begins at step 505 where the deletion component 505 sends a disposal report to a reviewer. The reviewer examines the report to identify any records that should not be deleted (e.g., because of ongoing litigation, security concerns, etc.) and place those records on hold. Once complete, the reviewer sends approval to the application 106 (at 510).

At step 515, the deletion component 215 deletes all records that have not been placed on hold. The deletion component 215 removes the records from the container and the record depository according to retention policies of the container. Further, the deletion component 215 removes pointers associated with physical records. At step 520, the generation component 210 creates a result report that lists the electronic and physical records from the disposal report that were successfully deleted. Further, the result report may also include records from the disposal report that were unable to be deleted (e.g., because of holds placed by the reviewer).

As stated, the deletion workflow includes a step where the physical media associated with the deleted physical records is destroyed. At step 525, the application 106 sends the result report to a repository that maintains the physical media. An assigned record keeper may review the result report to identify which physical media to destroy. Once identified, the record keeper destroys the physical media.

Figure 6:
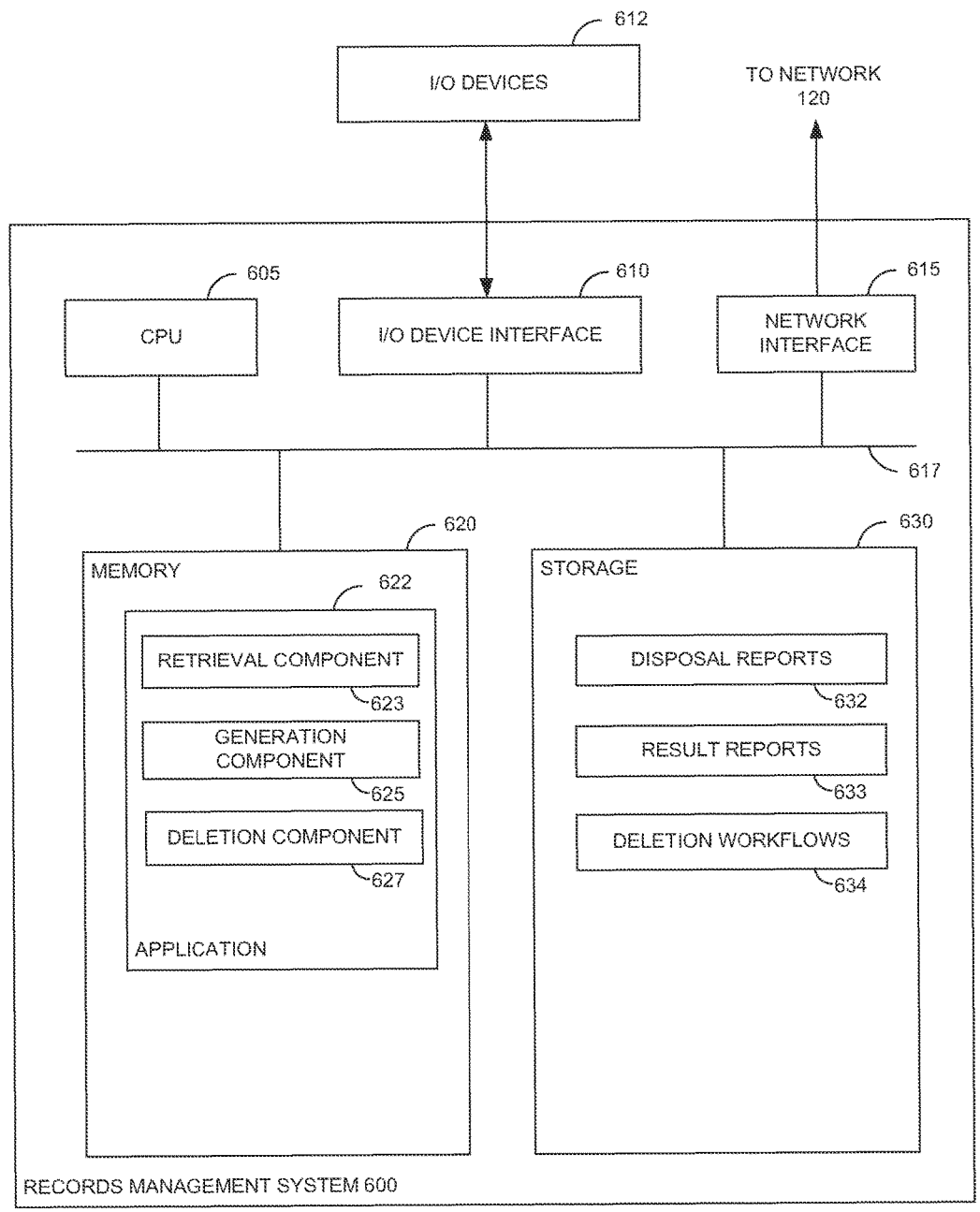
FIG. 6 illustrates a records management system configured to generate deletion reports and perform deletion workflows, according to one embodiment.

FIG. 6 illustrates an example records management system 600, according to one embodiment. As shown, the records management system 600 includes, without limitation, a central processing unit (CPU) 605, a network interface 615, an interconnect (i.e., bus) 617, a memory 620, and storage 630. The records management system 600 also may include an I/O device interface 610 connecting I/O devices 612 (e.g., keyboard, display, and mouse devices) to the ETL records management system 600.

The CPU 605 may retrieve and execute programming instructions stored in the memory 620. Similarly, the CPU 605 may retrieve and store application data residing in the memory 620. The interconnect 617 may facilitate transmission, such as of programming instructions and application data, among the CPU 605, I/O device interface 610, storage 630, network interface 615, and memory 620. CPU 605 is included to be representative of a single CPU, multiple CPUs, a single CPU having multiple processing cores, and the like. Additionally, the memory 620 is included to be representative of a random access memory. Furthermore, the storage 630 may be a disk drive storage device. As shown, the memory 620 includes the application 622.

Although shown as a single unit, the storage 630 may be a combination of fixed and/or removable storage devices, such as fixed disc drives, floppy disc drives, tape drives, removable memory cards or optical storage, network attached storage (NAS), or a storage area-network (SAN). As shown, the storage 630 includes disposal reports 632, result reports 633, and deletion workflows 634.

The application 622 is configured to generate disposal reports 632 that list electronic records and physical records that are scheduled to be deleted. The application 622 passes a GUID of each report to deletion workflows 634. The application 622 performs the deletion workflows 634. The application itself includes a retrieval component 623, a generation component 625, and a deletion component 627. The retrieval component 623 obtains records and associated information from containers in an enterprise record depository. The generation component 210 processes the records and generates the reports 632 and 633. The reports 632 may list records of a given container that are scheduled to be deleted after a certain period of time. The deletion component 627 initiates a deletion workflow associated with a report 632 created by the generation component 625. The deletion component 627 removes records listed in the report 632 according to policies associated with the container. The result reports 633 correspond to records that have been successfully deleted as well as records that were unable to be deleted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access application 106 or related data available in the cloud. For example, the application 106 could execute on a computing system in the cloud and generate disposal reports and perform deletion workflows associated with the reports. Further, the application 106 may also generate result reports based on deletions. In such a case, the application 106 may store the reports at a storage location in the cloud. Doing so allows a user (e.g., a record keeper of physical media) to access this information from any computing system attached to a network connected to the cloud (e.g., the Internet).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method for managing a record deletion workflow identifying both electronic records and physical media items, the computer-implemented method comprising:
   identifying, from an electronic depository and in a disposal report having a report globally unique identifier (GUID), records subject to deletion based on a document retention policy, wherein each record has a respective record GUID, wherein at least one of the records references a corresponding physical media item subject to the document retention policy;
   deleting the at least one identified record by passing the report GUID to the record deletion workflow without passing any record GUID; and
   responsive to deleting the at least one identified record, generating, by operation of one or more computer processors, an approval to cause destruction of the corresponding physical media item referenced by the at least one identified record, wherein the corresponding physical media item referenced by the at least one identified record is at least partially destroyed based on the approval.

2. The computer-implemented method of claim 1, further comprising:
   receiving a confirmation to delete a set of electronic records selected from the identified records; and
   deleting the set of electronic records.

3. The computer-implemented method of claim 2, further comprising:
   generating the disposal report listing the identified records;
   sending the disposal report to a reviewer;
   receiving, from the reviewer, the confirmation to delete the set of electronic records.

4. The computer-implemented method of claim 2, further comprising:
   upon receiving an indication that the at least one identified record has been deleted, initiating a deletion process for the corresponding physical media item subject to the document retention policy referenced by the at least one identified record.

5. The computer-implemented method of claim 1, further comprising:
   generating the disposal report listing the identified records.

6. The computer-implemented method of claim 1, further comprising:
   generating the disposal report listing the identified records, wherein the disposal report includes one or more of a filename, a location, and a description of the identified records, wherein the disposal report specifies which of the identified records reference physical media items.

7. The computer-implemented method of claim 1, wherein the identified records are stored in a records management system, wherein the records are subject to deletion after a date specified by the document retention policy, wherein the corresponding physical media item referenced by the at least one identified record is destroyed after the approval, wherein each record comprises an electric record.

8. The computer-implemented method of claim 7, further comprising:
generating the disposal report listing the identified records, wherein the at least one identified record is deleted after the disposal report is generated; and
prior to deleting the at least one identified record, receiving a confirmation specifying to delete the at least one identified record.

9. The computer-implemented method of claim 8, further comprising:
after receiving the confirmation, receiving a request to place the at least one identified record on hold in order to avoid deletion of the at least one identified record, wherein the at least one identified record is not deleted as long as the at least one identified record is on hold, wherein the corresponding physical media item is not deleted as long as the at least one identified record is on hold.

10. The computer-implemented method of claim 9, further comprising:
determining that the hold on the at least one identified record is subsequently lifted, wherein the at least one identified record is only thereafter deleted;
wherein the approval to cause destruction of the corresponding physical media item is generated only after deleting the at least one identified record, in order to maintain integrity of the records management system by avoiding a scenario in which the corresponding physical media item is destroyed while the at least one identified record still exists.

11. The computer-implemented method of claim 10, further comprising:
initiating the record deletion workflow in order to delete the identified records listed in the disposal report from the electronic depository, wherein the record deletion workflow specifies to delete the at least one identified record listed in the disposal report.

12. The computer-implemented method of claim 11, further comprising:
generating a result report identifying a set of records that were deleted and that have corresponding physical media items that have yet to be deleted, wherein the result report and the disposal report are separate reports, wherein the set of records includes the at least one identified record, wherein only the physical media items corresponding to the set of records is destroyed, wherein any physical media item not in any result report is not destroyed.

13. The computer-implemented method of claim 12, wherein the computer-implemented method is performed by an application having a plurality of components including:
a retrieval component configured to identify the records subject to deletion following the date specified by the document retention policy;
a generation component configured to generate the disposal report and the result report; and
a deletion component configured to initiate the record deletion workflow.

14. The computer-implemented method of claim 13, wherein the disposal report includes a filename, a location, and a description of the identified records, wherein the disposal report specifies which of the identified records reference physical media items.

15. The computer-implemented method of claim 14, wherein the electronic depository comprises a records database, wherein each of the disposal report and the results report has a respective report GUID.

16. The computer-implemented method of claim 15, wherein the report GUID of the disposal report is passed to the record deletion workflow in lieu of passing a data structure of individual record GUIDs, in order to permit a greater number of records to be processed in a single instance of the record deletion workflow than permitted by a specified maximum field size of the data structure that is supported by the records database, thereby improving scalability of the record deletion workflow, wherein the data structure comprises a string array.

17. The computer-implemented method of claim 1, wherein the data structure comprises a string array.

18. The computer-implemented method of claim 1, wherein the report GUID is passed to the record deletion workflow in lieu of passing a data structure of individual record GUIDs, in order to permit a greater number of records to be processed in a single instance of the record deletion workflow than permitted by a specified maximum field size of the data structure that is supported by the electronic depository, thereby improving scalability of the record deletion workflow.

19. The computer-implemented method of claim 1, further comprising:
generating a result report identifying a set of records that were deleted and that have corresponding physical media items that have yet to be deleted, wherein each of the disposal report and the results report has a respective report GUID.

20. The computer-implemented method of claim 1, wherein the electronic depository comprises a records database.

* * * * *